(12) United States Patent
Ahmad et al.

(10) Patent No.: US 7,113,799 B2
(45) Date of Patent: Sep. 26, 2006

(54) METHOD AND APPARATUS FOR A HYBRID MOBILE TERMINAL

(75) Inventors: Azeem Ahmad, Plano, TX (US); Linda Morales, Dallas, TX (US); Geng Wu, Plano, TX (US); David Paranchych, Richardson, TX (US); Mini Vasudevan, Richardson, TX (US); Yusuke Higashi, Dallas, TX (US)

(73) Assignee: Nortel Networks Limited, St. Laurent (CA)

( * ) Notice: Subject to any disclaimer, the term of this patent is extended or adjusted under 35 U.S.C. 154(b) by 342 days.

(21) Appl. No.: 09/995,963

(22) Filed: Nov. 28, 2001

(65) Prior Publication Data

US 2002/0082029 A1 Jun. 27, 2002

Related U.S. Application Data

(60) Provisional application No. 60/253,436, filed on Nov. 28, 2000.

(51) Int. Cl.
*H04Q 7/20* (2006.01)
(52) U.S. Cl. .................. 455/458; 455/426.1; 455/436; 455/466; 455/552.1; 370/331; 370/353
(58) Field of Classification Search ................ 455/426, 455/436, 452, 458, 466, 552.1; 370/331, 370/349, 353
See application file for complete search history.

(56) References Cited

U.S. PATENT DOCUMENTS

| | | | |
|---|---|---|---|
| 5,287,401 A | * | 2/1994 | Lin .......................... 379/93.35 |
| 5,519,767 A | * | 5/1996 | O'Horo et al. ............ 379/67.1 |
| 5,745,695 A | * | 4/1998 | Gilchrist et al. ............ 709/227 |
| 6,011,909 A | * | 1/2000 | Newlin et al. .............. 709/227 |
| 6,078,581 A | * | 6/2000 | Shtivelman et al. ........ 370/352 |
| 6,118,864 A | | 9/2000 | Chang et al. | |

(Continued)

FOREIGN PATENT DOCUMENTS

WO WO-95-26113 * 9/1995

(Continued)

OTHER PUBLICATIONS

Lars Ekeroth, et al.; "GPRS support nodes (www.ericsson.com/about/publications/review/2000_03/files/2000034.pdf)" Ericsson Review No. 3, 2000, Sep. 2000; pp. 156-169; p. 156, right-hand column, line 18; p. 158, left-hand column, line 9; p. 160, right-hand column, last paragraph; p. 163, right-hand column, line 6; figs. 1-4, 7.

(Continued)

*Primary Examiner*—Steve M. D'Agosta
(74) *Attorney, Agent, or Firm*—Garlick Harrison & Markison; James A. Harrison; Kevin L. Smith (57) ABSTRACT

An access network controller and a base station controller are formed to define an interface there between that enables the two systems to facilitate and respond to a voice call that is to be set up to a hybrid mobile station even though the hybrid mobile station is presently engaged in a data only call. More specifically, the base station is formed to generate a pseudo-page signal to the access network controller to determine whether the hybrid mobile station is present and available prior to the base station generating paging signals to establish the voice call. According to the response received from the access network controller, the base station either pages the hybrid mobile station to establish the voice call, forwards the call to voice mail, or forwards the call either to an Internet Call Delivery Server or to an Internet Call-Waiting Server.

12 Claims, 5 Drawing Sheets

U.S. PATENT DOCUMENTS 6,289,092 B1 * 9/2001 Nishiara ................ 379/215.01

FOREIGN PATENT DOCUMENTS

| WO | WO 9526113 |   | 9/1995 |
|----|------------|---|--------|
| WO | WO97-26764 | * | 7/1997 |
| WO | WO 9726764 |   | 7/1997 |
| WO | WO 9809457 |   | 3/1998 |
| WO | WO 0005907 |   | 2/2000 |

OTHER PUBLICATIONS

"ETSI EN 300 940 V6.3.1: Digital cellular telecommunications system (Phase 2+); Mobile radio interface layer 3 specification (GSM 04.08 version 6.3.1 Release 1997)", EN 300 940 V6.3.1, XX, XX, pp. 164-201 XP002210417 *chapter 5.2*.

* cited by examiner

METHOD AND APPARATUS FOR A HYBRID MOBILE TERMINAL

CROSS REFERENCE TO RELATED APPLICATIONS

This application claims priority to and incorporates U.S. Provisional Application having a Ser. No. of 60/253,436 and a filing date of Nov. 28, 2000.

BACKGROUND OF THE INVENTION

1. Technical Field

The present invention relates to mobile communication devices and, more particularly, to hybrid mobile stations capable of communicating in a data-only mode with a data network and in a voice mode with a voice network.

2. Related Art

Traditional wireless mobile networks include Mobile Station Controllers (MSCs), Base Station Controllers (BSCs) and Base Transceiver Station Systems (BTSs) that jointly operate to communicate with mobile stations over a wireless communication link. Examples of common networks include Global System for Mobile Communications (GSM) networks, Time Division Multiple Access (TDMA) networks and Code Division Multiple Access (CDMA) networks.

To establish a wireless communication link, an MSC communicates with a BSC to prompt the BTS (collectively "Base Station" or "BS") to generate paging signals to a specified mobile station within a defined service area typically known as a cell or sector (a cell portion). The mobile station, upon receiving the page request, responds to indicate that it is present and available to accept an incoming call. Thereafter, the BS, upon receiving a page response from the mobile station, communicates with the MSC to advise it of the same. The call is then routed through the BS to the mobile station as the call setup is completed and the communication link is created.

Next generation cellular networks that are presently being developed are being formed, in contrast to traditional systems, to create the ability for mobile stations to receive data. For example, many new mobile stations, often referred to as mobile terminals, are being developed to enable a user to surf the web or send and receive e-mail messages through the wireless mobile terminal. Accordingly, different systems and networks are being developed to develop such a capability and improve their operational characteristics. One example of a system that is presently being deployed with voice and data capabilities is the CDMA 2000 network. The CDMA 2000 network, however, is optimized for voice transmissions as it grew out of a voice network (IS-95A) and therefor is not optimized for transmitting data. More formally, the 1xRTT Standard defines CDMA operation.

One data network that is being developed is defined by the 1xEDO standard. The 1xEDO standard defines a timeburst system utilizing a 1.25 MHz carrier that is set at a carrier frequency that is adjacent to the frequencies used by the voice networks. In one particular network, a 1.67 millisecond (mS) burst is used for the forward link in the 1xEDO network. The 1xEDO standard data-only network is optimized for streaming video and other such data applications. The next generation of CDMA networks that are being deployed can communicate with voice and data networks but do not process data as efficiently as the networks formed according to the 1xEDO Standard as well as other data standards.

The data-only 1xEDO networks that have been previously described are not formed to interact seamlessly between the voice and data networks. More specifically, a Dual Mode Mobile Station, herein also referred to as a Hybrid Mobile Station (HMS) that can communicate with a voice network, such as a CDMA 2000 network, as well as a data only network, such as the 1xEDO networks described herein, is not able to hear and respond to a page for an incoming call from a voice network such as the CDMA 2000 network while engaged in a data (data-only) call with the 1xEDO network. Accordingly, a system and method is needed that facilitates call setup and call delivery for voice calls for the HMS's that are in a data call with the 1xEDO network.

SUMMARY OF THE INVENTION

An access network controller and a base station controller are formed to define an interface there between that enables the two systems to facilitate and respond to a voice call that is to be terminated to a hybrid mobile station even though the hybrid mobile station is presently engaged or potentially is presently engaged in a data only call. More specifically, the base station (BSC/BTS) is formed to generate a signal to the access network controller, referenced herein as a pseudo-page signal, to determine whether the hybrid mobile station is present and available. The pseudo-page signal is transmitted prior to the transmission of paging signals by the base station to establish the voice call. According to the response received from the access network controller, the base station either pages the hybrid mobile station to establish the voice call, forwards the call to voice mail, or forwards the call either to an Internet Call Delivery Server or to an Internet Call-Waiting Server for further processing.

The access network controller also is formed to interpret and respond to the pseudo-page signal generated by the base station. In one embodiment of the invention, the access network controller examines a user profile for the hybrid mobile station to determine its preferences whenever a data call is active while a voice call is being received. For example, a subscriber profile might specify that the hybrid mobile station is not to be interrupted from the data call and that the access network controller is to respond to the base station to advise it that the hybrid mobile station is not present. Another response includes the access network controller advising the base station that the hybrid mobile station is present but not available. A third response of the access network controller is to command the hybrid mobile station to suspend or terminate the data call so that it may receive and respond to paging signals from the base station and then to advise the base station that the hybrid mobile station is ready and available for being paged.

In yet another embodiment of the present invention, the mobile switching center is created to forward the call automatically to an Internet Call Delivery Server or to an Internet Call-Waiting Server whenever it receives a pseudo-page signal from a base station while a data call is active for a hybrid mobile station to which the voice call is to be set up.

In yet another embodiment of the invention, the mobile switching center is formed to automatically route the voice call to a voice mail server whenever a data call is active for the hybrid mobile station.

The hybrid mobile station is formed to include a memory that further includes computer instructions that define the operational logic to accomplish the above-described capabilities and processes according to selection and preferences of an administrator of an access network controller and/or the defined preferences of a user of a hybrid mobile station. Accordingly, each of the various responses may be provided to subscribers as subscriber features according to selection by the subscriber.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
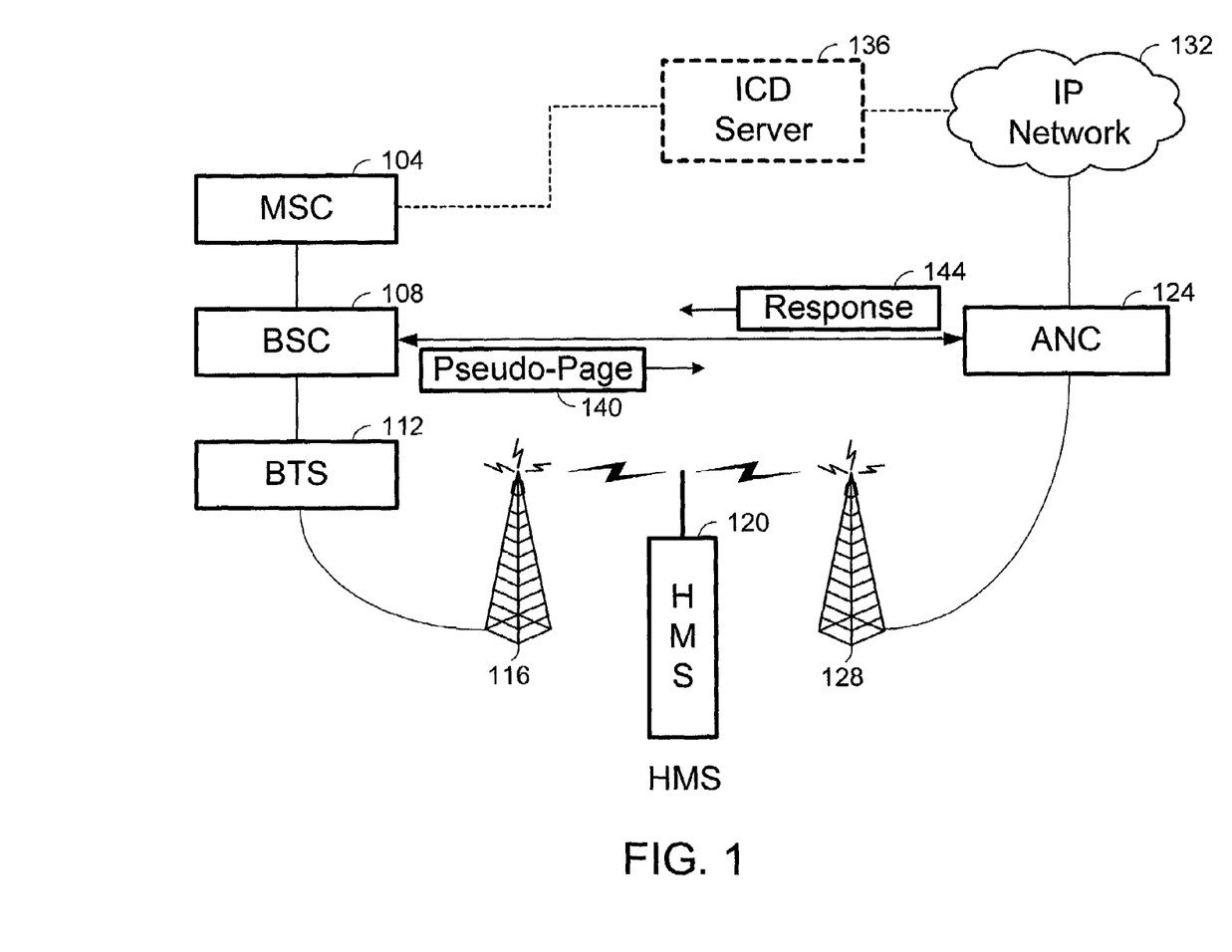
FIG. 1 is a functional block diagram of a communication network that includes a voice network and a data network according to one embodiment of the present invention.

FIG. 1 is a functional block diagram of a communication network that includes a voice network and a data network according to one embodiment of the present invention. As may be seen, an MSC 104 is coupled to communicate with a BSC 108. BSC 108, in turn, is coupled to communicate with BTS 112, which generates communication signals that are broadcast from tower 116 to HMS 120. The MSC 104 operates call set up signals in a known manner to set up a call with HMS 120 within a defined cellular area that is served by BTS 112. For example, BTS 112 typically serves a cell, which may or may not have cell sectors.

Additionally, an Access Network Controller (ANC) 124 of an 1xEDO network is formed to communicate and generate communication signals to HMS 120 by way of tower 128. ANC 124 further is coupled to communicate through the Internet with an IP device, such as an IP Router, which IP device is part of a data packet network. Additionally, as may be seen, an Internet Call Delivery Server (ICDS) 136 is coupled to communicate with ANC 124 through IP network 132. While the example of FIG. 1 illustrates separate towers for the 1xEDO and 1xRTT (voice) networks, the transmissions for each network may occur from the same or co-located towers and are not required to be geographically separate as shown in FIG. 1.

Because the current 1xEDO standards do not provide for the HMS 120 to listen for and respond to pages from BTS 112 while the HMS 120 is in a data call with ANC 124, a system is needed for the ANC of the 1xEDO network to advise the voice network in one of several specified manners that the HMS is not available to take a call so that the BS does not needlessly generate paging signals. For example, one specified response is that the HMS 120 is present but currently is within a data call.

Without such a capability, MSC 104 would prompt BSC 108, which, in turn, would prompt BTS 112 to generate paging signals to HMS 120. Because HMS 120 would not respond to the paging signals while it is in a data call, BTS 112 would report to BSC 108 and ultimately to MSC 104 that HMS 120 is not present.

Network resources are wasted because of overhead-related transmissions and communications that occur between the various elements of the voice network due to needlessly paging of the HMS and also because of the failure of HMS 120 to respond to the paging signals.

If, on the other hand, MSC 104 were to determine that the HMS 120 is present but merely unavailable, or that it is not present without having to generate paging signals, then more efficient processes may be implemented for the voice call for HMS 120. For example, the MSC 104 may be formed, according to the present invention, to know to direct the voice call to voice mail, rather than to deliver a busy signal to the calling party or to attempt to locate the mobile station in another voice network area.

According to one aspect of the present invention, the BSC 108 generates a pseudo-page signal 140 that is transmitted over a communication link to ANC 124. The pseudo-page signal 140 is a signal that prompts the ANC to produce a response signal 144 that allows the BSC 108 to determine how to process a call if the HMS 120 is presently engaged in a data call.

In one embodiment of the present invention, a traditional BSC 108 is formed to generate the pseudo-page signal 140 to ANC 124 each time a call is being set up to an HMS 120. For example, by examining the form of the mobile station ID of the HMS 120, BSC 108 may readily determine whether the mobile station to which the call is to be terminated is a traditional voice-only mobile station or whether it is a hybrid mobile station such as HMS 120. In the case where the call is to be terminated to a hybrid mobile station such as HMS 120, the BSC 108 generates the pseudo-page signal 140 to ANC 124.

Thereafter, the BSC waits for the response before prompting the BTS 112 to generate the paging messages. Alternatively, if the mobile station ID of the mobile station to which the call is to be terminated indicates that the mobile station is not an HMS, such as HMS 120, then the BSC merely prompts BTS 112 to generate the paging signals without transmitting the pseudo-page signal 140 to ANC 124.

Figure 2:
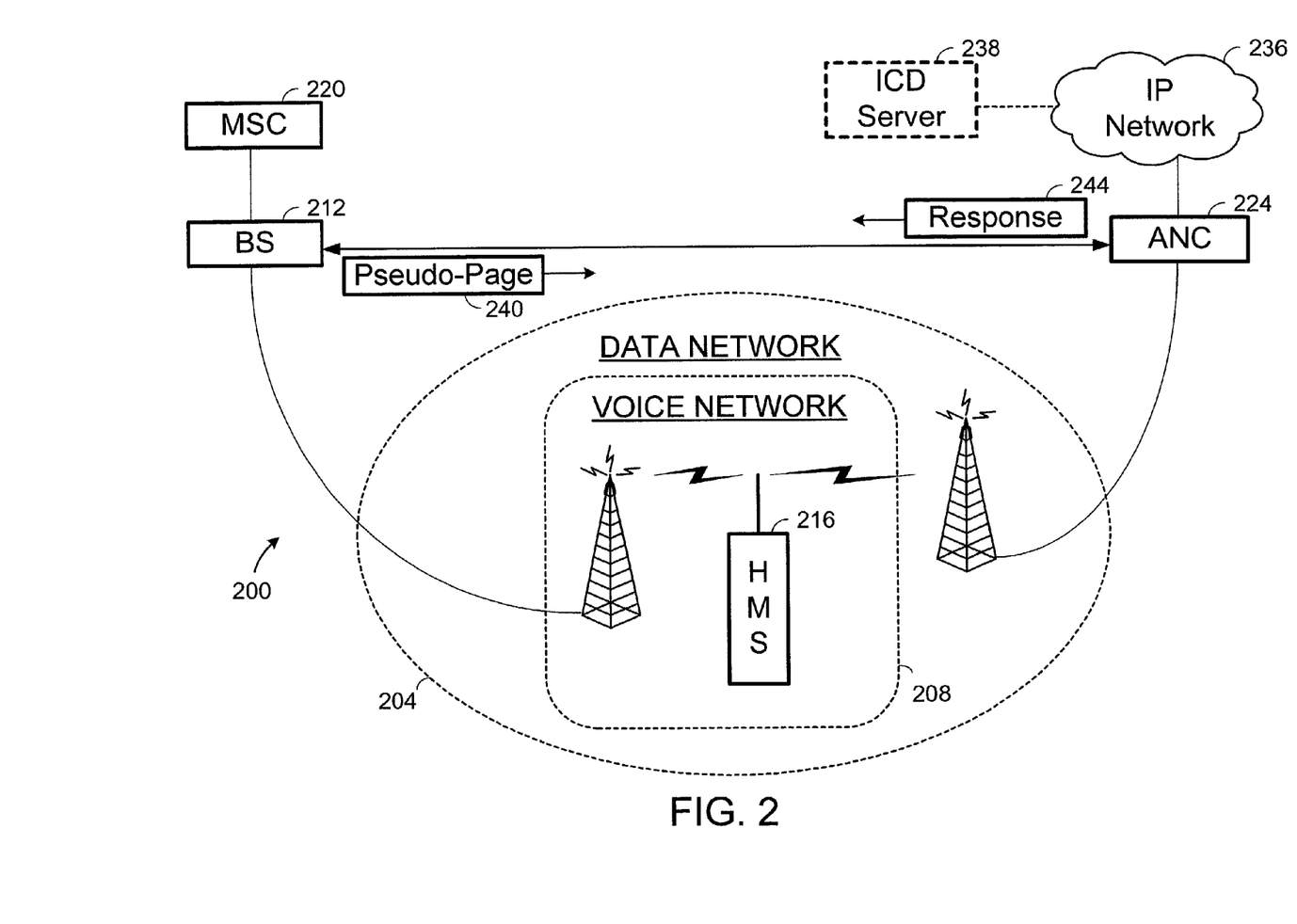
FIG. 2 is a functional block diagram of a network for communicating with hybrid mobile stations of the present invention.

FIG. 2 is a functional block diagram of a network for communicating with hybrid mobile stations of the present invention. Referring now to FIG. 2, a network shown generally at 200 comprises a data network 204 (e.g., 1xEDO) that overlays a voice network 208 (e.g., 1xRTT). Voice network 208 includes a base station (BS) 212 that generates paging signals and other communication signals to a hybrid mobile station (HMS) 216. Thus, if a call is to be terminated to HMS 216, MSC 220 communicates with BS 212 to generate the paging signals to HMS 216.

The example of FIG. 2 shows that the BS 212 and MSC 220, as well as the ANC 224 and an IP device of an IP network 236 are all placed external to the data network 204 and voice network 208. It is understood, of course, that these systems may be placed either within or external to the voice and data networks. Additionally, an Internet Call Delivery Server (ICDS) 238 is coupled to communicate with HMS 216 through the IP network 236 and through ANC 224 to deliver Voice over IP (VOIP) calls and related signaling thereto.

In operation, whenever a voice call is to be set up with HMS 216, MSC 220 communicates with BS 212 to determine which cell area or sector is presently serving the HMS 216. Under traditional or known systems, BS 212 merely generates the paging signals to HMS 216 over communication link 220. If the HMS 216 does not respond, for example, because it is in a data call with ANC 224, then BS 212 reports to MSC 220 that HMS 216 is not presently available.

Accordingly, for the inventive system, if BS 212 determines that a call is being set up to a hybrid mobile station such as HMS 216, then BS 212 generates a pseudo-page signal 240 that is transmitted to ANC 224. The purpose of pseudo-page signal 240 is to determine whether HMS 216 is presently engaged within a data call with ANC 224. Accordingly, ANC 224 generates a pseudo-page response signal 244 to BS 212 to enable BS 212 to determine how to properly respond to the call setup request by MSC 220.

As will be described in greater detail elsewhere, BS 212 includes logic to determine whether the mobile station for which a call is being set up is a traditional mobile station t5 that primarily communicates over voice networks or whether it is a hybrid mobile station such as HMS 216 of FIG. 2. Additionally, ANC 224, in one embodiment of the inventive system, is formed to include HMS profile information to determine an appropriate response to the pseudo-page signal 240. For example, in one embodiment of the invention, the HMS profiles stored within ANC 224 enable the user to specify that the ANC is to advise the BS that the HMS 216 is present but is busy. Other responses may also be defined that are identified within pseudo-page response signal 244. It is understood, of course, that the profile information for HMS 216, as well as other HMSs, may be formed within ANC 224 as described herein or in a database server that is coupled to communicate with ANC 224.

In one embodiment of the present invention, ANC 224 communicates with HMS 216 by way of a wireless transmission according to 1xEDO (data) network standards to instruct HMS 216 to terminate or suspend the data call and to listen for paging signals from BS 212. According to user selections, however, the HMS 216 may either ignore the command to drop the data-only call or may flash a message to the user of HMS 216 to advise the user of an incoming voice call by way of the voice network 208. In an alternate embodiment, however, the command to drop or suspend the data call is generated according to definitions within the profile information for the HMS. Thus, whether the ANC command to the HMS to suspend or drop the data call is always sent or whether the command is sent according to profile information for the HMS 216 is a function of operator implementation.

In yet another embodiment of the present invention, the HMS 216 is formed to advise the user of an incoming voice call and to enable the user to specify whether it wants to take the voice call and, if not, to prompt it to generate communication signals to ANC 224 to respond to BS 212 to inform the BS 212 that the HMS 216 is busy or unavailable. Any of the responses defined herein, however, may be prompted or initiated according to the user's response.

Whenever an HMS is in a data call, meaning that it is engaged in an active 1xEDO session, and a calling party is attempting to establish a voice call with the user of the HMS, there are several possibilities for advising the user of the HMS that it is receiving a voice call. One option is to notify the user of the HMS by way of an Internet Call-Waiting Server such as ICWS 238. The Internet Call-Waiting Server 238 delivers data to the HMS 216 over the Internet and then from the ANC to the HMS over a wireless communication link in the form of packet data that has been originated from the Internet.

To achieve this, using conventional Internet Call-Waiting Servers (ICWSs), the user of the HMS 216 must be a subscriber of such service and typically must register over the Internet with the ICWS for the Internet call-waiting notification. In one embodiment of the invention, the MSC 220 forwards an incoming voice call to the Internet Call-Waiting Server whenever it determines that the HMS 216 is in a data call. The Internet Call-Waiting Server would then notify the subscriber via the IP Network 236 and wireless communication link between the ANC 224 and the HMS 216 that a voice call (e.g., 1RTT network call) is waiting. The subscriber may then choose to accept the voice call as a voice over IP call, suspend the data session with the data network (e.g., 1EDO) and transition to a voice (e.g., 1RTT) mode to receive and respond to pages and to accept the call or reject the call.

For the voice network to be aware that the HMS 216 is in a data call, however, interface signal changes between the 1xEDO ANC and the 1xRTT base station are to deliver "pseudo-page" messages and the corresponding responses. Here, the pseudo-page message is generated by the base station (BS) 212 to the ANC 224 to determine whether the HMS 216 is presently engaged in a 1xEDO data session.

Based upon the response from the ANC, the base station 212 would then transmit paging messages to set up the 1xRTT voice call. Thus, in the example above, the voice network, upon receiving a pseudo-page response indicating that the HMS 216 is present but not available, then generates signals to the ICDS 238 to prompt it to advise the HMS of the incoming voice call.

In one embodiment of the invention, however, the 1xEDO ANC, upon receiving the pseudo-page signal, redirects the HMS to suspend the 1xEDO data session to be able to receive and respond to paging messages from the base station of the 1xRTT network. According to user selection, the HMS may either ignore the direction to switch over or may send signaling to the ANC to advise whether the voice call is to be forwarded to an Internet Call-Waiting Server or to a voice message server.

Figure 3:
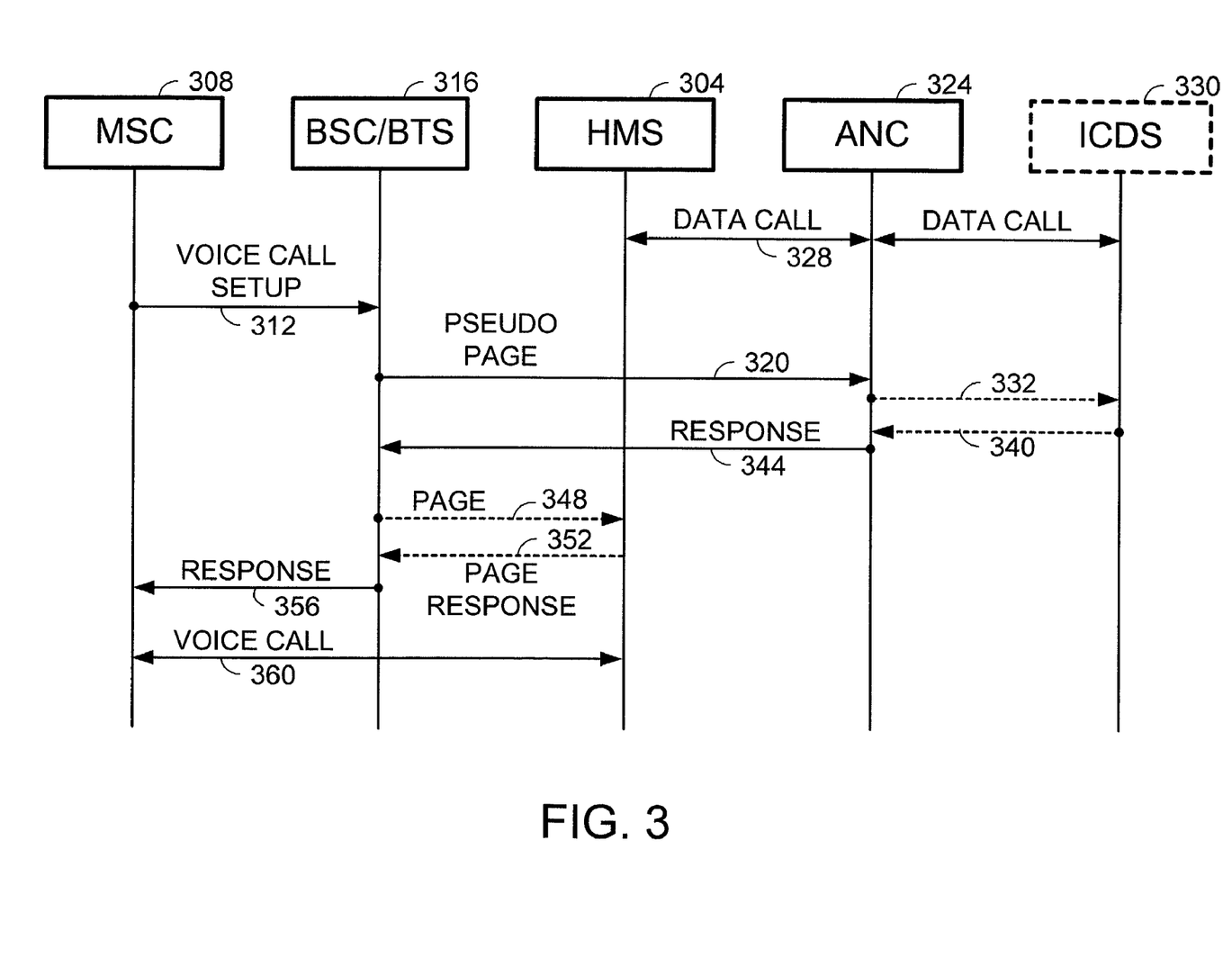
FIG. 3 is a signal sequence diagram that illustrates one embodiment of the present invention.

FIG. 3 is a signal sequence diagram that illustrates one embodiment of the present invention. Referring now to FIG. 3, whenever a call is to be set up with an HMS 304, MSC 308 generates voice call setup signals 312 that are transmitted to BSC/BTS 316. BSC/BTS 316, upon receiving at least one voice call setup signal 312, determines that the terminating mobile is a hybrid mobile station, and then generates a pseudo-page signal 320 that is transmitted to ANC 324. For the present example, a data call as shown by line 328 is in process between the HMS 304 and the ANC 324 at the time that the MSC 308 generates the voice call setup signals 312 that are transmitted to BSC/BTS 316.

Accordingly, when BSC/BTS 316 generates pseudo-page signals 320 to ANC 324, ANC 324 is aware that HMS 304 is busy and in a data call. As was described before, one option is for ANC 324 to generate a command to HMS 304 to prompt it to drop the data call so that it may listen for page signals from the BSC/BTS 316.

Another option, as is illustrated here in FIG. 3, is for the ANC to generate a specified signal 332 that is transmitted to an Internet Call Delivery Server (ICDS) 330, which ICDS 330 is in communication with HMS 304 by way of ANC 324 for the data call. ICDS 330, upon receiving the specified signal 332, advising it that a voice call is to be terminated to HMS 304, then generates a signal that is transmitted through a data packet network and through ANC 324 as a signal that is part of the ongoing data packet call of data call 328 to deliver a message to HMS 304 to advise it that a voice call is waiting for it and that paging signals either are being transmitted or are about to be transmitted to it.

Upon receiving a response from HMS 304, ICDS 330 generates a signal 340 to ANC 324 to advise it that the HMS 304 is ready to take the call or, alternatively, that it has rejected accepting the call. The response signal 340 then prompts ANC 324 to generate an appropriate response signal 344 that is transmitted to BSC/BTS 316.

For example, once the HMS 304 is ready to receive the voice call from BSC/BTS 316, and ICDS 330 informs ANC 324 of the same, then response signal 344 from ANC 324 to BSC/BTS 316 advises the BSC/BTS of the same. Responsive thereto, BSC/BTS 316 generates traditional paging signals 348 to HMS 304 that, in turn, leads to HMS 304 generating page response signals in a known manner. Once BSC/BTS 316 receives page response signals 352, a response signal 356 is generated to MSC 308 which enables MSC 308 to establish a voice call to HMS 304 as represented by line 360.

While the example of FIG. 3 illustrates the usage of an ICDS 330 to communicate with HMS 304 for facilitating the transition to a voice call, the ICDS 330 itself may be set up to respond in different manners. Additionally, other embodiments of the invention include, according to a subscriber profile for HMS 304, to merely forward the voice call to a voice mailbox system or to set up specialized interfaces to enable the ANC and HMS to communicate regarding what should be done with the voice call that is to be set up. Such processing may occur in response to an indication received from HMS 304 that the user does not want to accept the call. Alternatively, ANC 324 may forward the call in a defined manner according to profile information for the HMS 304.

Figure 4:
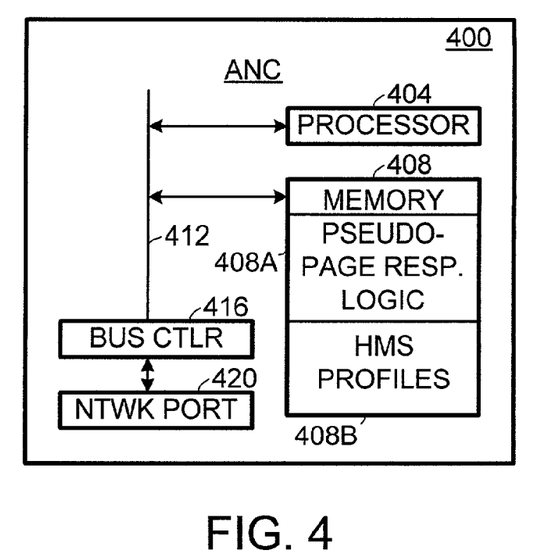
FIG. 4 is a functional block diagram of an access network controller (ANC) formed according to one embodiment of the present invention.

FIG. 4 is a functional block diagram of an access network controller (ANC) formed according to one embodiment of the present invention. As may be seen, ANC 400 includes a processor 404 that is coupled to communicate with a memory 408 by way of a bus 412. Bus 412 further is coupled to a bus controller 416 that controls the synchronization and timing of communications on bus 412. Bus controller 416 further is coupled to a network port 420 to enable ANC 400 to communicate with external devices. Memory 408 further includes a portion 408A for storing computer instructions that define pseudo-page response logic and a portion 408B for storing computer instructions that define HMS profile information. While not explicitly shown, memory 408 further comprises computer instructions that are executed by processor 404 that relate to standard operation ANC 400.

In operation, processor 404 retrieves computer instructions from memory 408 by way of bus 412 for execution. It is the execution of the computer instructions that create the operational logic of ANC 400 that relates to the pseudo10 page responses according to specified conditions and according to HMS profile information for a given HMS as defined by the computer instructions within memory portion 408B. The specific operational logic of the various embodiments of the present invention as are described here in this application with respect to the described operational logic and operational process steps or methods are defined within the memory 408. While FIG. 4 illustrates a traditional processor/software design approach, the operational logic may also be implemented in logic designs and in programmable logic designs or in any combination thereof.

Figure 5:
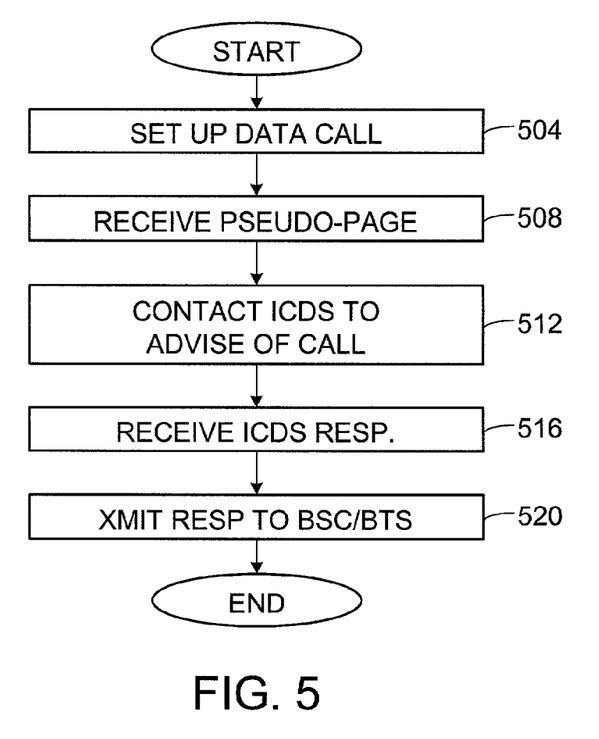
FIG. 5 is a flowchart illustrating a call processing method as performed by an access network controller according to one embodiment of the present invention.

FIG. 5 is a flowchart illustrating a call processing method as performed by an access network controller according to one embodiment of the present invention. Initially, a data call is set up between an access network controller (ANC) and a hybrid mobile station (step 504). After the data call is set up, the ANC receives a pseudo-page from a base station controller/base station transceiver system (BSC/BTS) for a voice call that is to be terminated to the HMS (step 508).

Accordingly, the pseudo-page, as is understood, is to determine whether a data call is in effect between the ANC and the HMS. In the present embodiment of this invention, the ANC then contacts an Internet Call Delivery Server (ICDS) to advise it of a voice call that is being set up for the HMS (step 512).

Once the ICDS receives signaling to advise it of the voice call, while the data call is in effect, the ICDS, according to its programming, determines an appropriate response and transmits it to the ANC. Accordingly, the ANC then receives the ICDS response (step 516) and transmits an appropriate or corresponding response to the BSC/BTS (step 520).

For example, the ICDS, in one embodiment of the invention, is set up to send signaling to the HMS through the data call communication channels to advise it that a voice call is being received. As is known by those skilled in the art, the ICDS can provide, among other services, a call-waiting type indication to the user participating in a data call to enable him or her to switch over to the voice call. Thus, in this embodiment, the user would temporarily terminate the data call, enabling the HMS to receive and respond to paging signals for the voice call, complete voice call set up, and then, upon termination of the voice call, resume the data call. Accordingly, if the user profile for the HMS is one that facilitates such a process, the ICDS responds to the ANC by advising it that the mobile station is ready to or will soon be ready to receive and respond to paging signals from the voice network.

Figure 6:
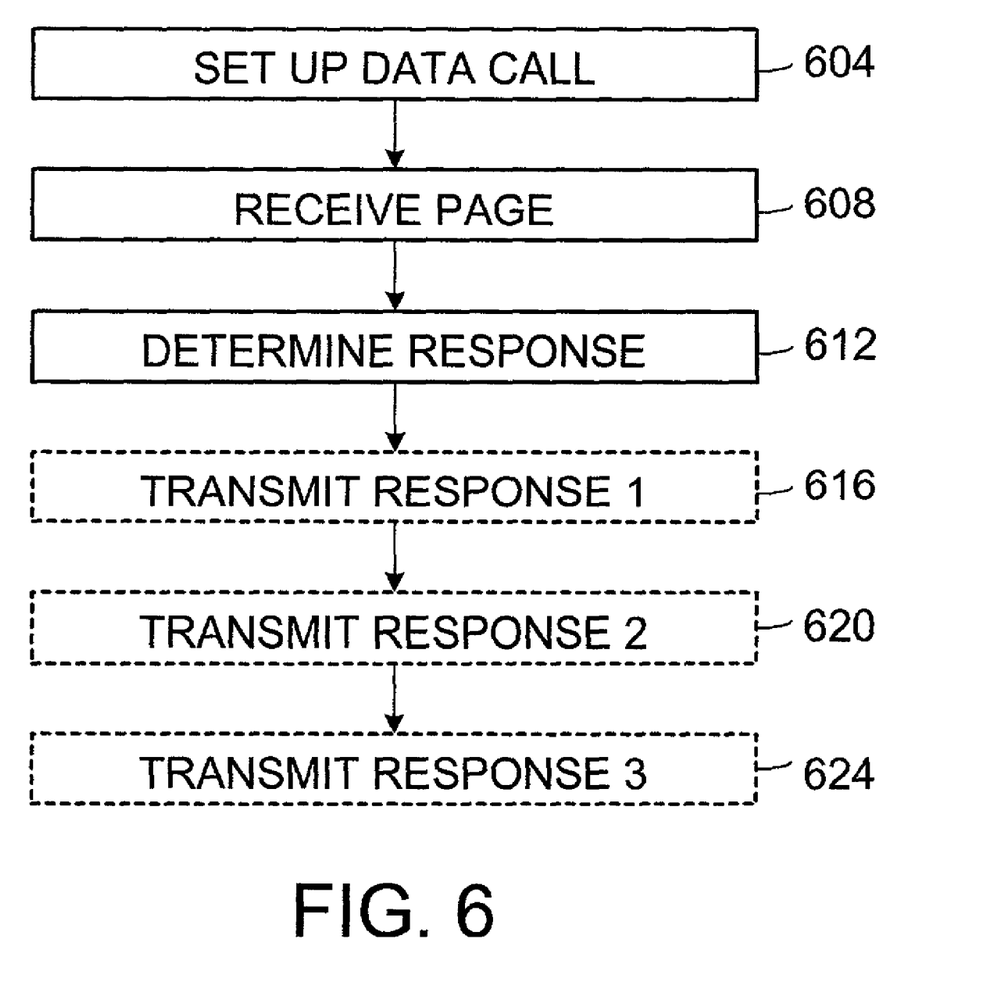
FIG. 6 is a flowchart illustrating a method for processing a voice call according to one embodiment of the present invention.

FIG. 6 is a flowchart illustrating a method for processing a voice call according to one embodiment of the present invention. Initially, an ANC sets up a data call between it and a hybrid mobile station (step 604). Sometime after the call is set up, the ANC receives a pseudo-page from a BSC/BTS (BS) (step 608). Thereafter, the ANC examines a subscriber profile to determine the appropriate response (step 612). Among other responses, one possible response of the ANC is to generate a page to the HMS to redirect it to accept the voice call. Accordingly, in such a scenario, one response is for the ANC to transmit an indication to the BSC/BTS that the HMS has been paged and that it is being redirected to accept and respond to pages from the voice network (step 616). Another alternate response that may be determined by the ANC in step 612 is to transmit an indication to the BSC/BTS that the HMS is not present whenever the HMS is actively engaged in a data call (step 620). Another alternative response is to transmit a signal to the BSC/BTS that indicates the HMS is present but not available to receive paging signals for a voice call (step 624).

According to the response received from the ANC, the BSC would then generate its own response. For example, if it receives the response of step 616, namely, an indication that the HMS is being redirected to the voice network, then the BSC/BTS would process the voice call in a routine manner by initially generating paging signals to which the HMS would be expected to respond. If the BSC/BTS either receives the response of step 620 or of step 624, then according to a subscriber profile for the specified HMS, the MSC would forward the call either to an Internet Call-Waiting Server or directly to a voice mail server for processing in specified manners.

The inventive method and apparatus disclosed herein are particularly advantageous in that they provide a capability for a hybrid mobile station to have incoming voice calls be processed in a specified manner that increases system and network efficiencies.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims. As may be seen, the described embodiments may be formed in many different ways without departing from the scope or teachings of the invention. For example, any combination of the described methods may be combined to create an inventive system that allows a voice network to determine that a mobile station is unavailable without having to generate paging signals unnecessarily.

The invention claimed is:

1. An access network controller, comprising:
   a processor;
   communication circuitry within the access network controller;
   a memory for storing computer instructions that define profile information for at least one hybrid mobile station (HMS) and that define operational logic relating to a response of the access network controller to a received pseudo-page signal and that define profile information that specify that the access network controller is to generate a response to a base station to advise it that the HMS has been paged and is being redirected to receive pages from the voice network; and
   a network port for enabling the access network controller to communicate with external systems.

2. The access network controller of claim 1 wherein the computer instructions that define the profile information specify that the access network controller is to generate a response to a base station to advise it that the HMS is unavailable.

3. The access network controller of claim 1 wherein the computer instructions that define the profile information specify that the access network controller is to generate a response to a base station to advise it that the HMS is present but not available for a voice call.

4. The access network controller of claim 1 wherein the memory further includes computer instructions that define an operational logic for forwarding a voice call to an Internet Call Delivery Server.

5. The access network controller of claim 1 wherein the memory further includes computer instructions that define operational logic for forwarding a voice call to an Internet Call-Waiting Server.

6. A method in a communication network including a voice network and a data network, comprising:

receiving a pseudo-page signal transmitted by a base station in a specified interface signal between the base station and an access network controller;

generating, from the access network controller, a response to the base station to advise it that a hybrid mobile station has been paged and is being redirected to receive pages from the voice network, wherein the response includes waiting long enough to enable the hybrid mobile station to switch from the data network to the voice network and then advising the base station that the hybrid mobile station is at least one of being presently available and not being presently available; and commanding the hybrid mobile station to redirect and to suspend a data call so that it may receive and respond to paging signals transmitted by the base station.

7. The method of claim 6 wherein the response includes forwarding the voice call to an Internet Call-Waiting Server.

8. The method of claim 6 wherein the response further includes advising the base station whether the hybrid mobile station is present but not available.

9. The method of claim 6 wherein the response includes advising the base station whether the hybrid mobile station is present and available.

10. An access network controller, comprising:
    a processor;
    communication circuitry within the access network controller;
    a memory for storing computer instructions that define profile information for at least one hybrid mobile station (HMS) and that define operational logic relating to a response of the access network controller to a received pseudo-page and that define operational logic for forwarding a voice call to one of an Internet Call Delivery Server or to an Internet Call-Waiting Server; and
    a network port for enabling the access network controller to communicate with external systems.

11. The access network controller of claim 10 wherein the computer instructions that define the operational logic relating to a response of the access network controller to a pseudo-page is to further respond that the HMS is unavailable.

12. The access network controller of claim 11 wherein the computer instructions that define the operational logic relating to a response of the access network controller to a pseudo-page is to further respond that the HMS is present but not available for a voice call.

* * * * *